(12) United States Patent
Puchta et al.

(10) Patent No.: US 8,875,012 B1
(45) Date of Patent: Oct. 28, 2014

(54) FRONT-END TOOL FOR DISPLAYING DIAGNOSTIC INFORMATION TO FACILITATE WEB PAGE DEVELOPMENT

(71) Applicant: LinkedIn Corporation, Mountain View, CA (US)

(72) Inventors: Georg Puchta, Mountain View, CA (US); Veena Basavaraj, Mountain View, CA (US); Johnathan Leppert, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/874,297

(22) Filed: Apr. 30, 2013

(51) Int. Cl.
*G06F 17/21* (2006.01)
*G06F 17/30* (2006.01)

(52) U.S. Cl.
CPC .................. *G06F 17/3089* (2013.01)
USPC ......................................................... 715/234

(58) Field of Classification Search
CPC .................................................. G06F 17/218
USPC ......................................................... 715/234
See application file for complete search history.

(56) References Cited

U.S. PATENT DOCUMENTS

| | | | |
|---|---|---|---|
| 7,975,019 B1* | 7/2011 | Green et al. ................. 709/217 |
| 2001/0047402 A1* | 11/2001 | Saimi et al. .................. 709/219 |
| 2005/0097445 A1* | 5/2005 | Day et al. .................... 715/501.1 |
| 2006/0235947 A1* | 10/2006 | Gray et al. .................... 709/218 |
| 2006/0277212 A1* | 12/2006 | Error ............................. 707/102 |
| 2007/0106956 A1* | 5/2007 | Platt et al. .................... 715/808 |
| 2008/0189156 A1* | 8/2008 | Voda et al. ....................... 705/7 |
| 2008/0228920 A1* | 9/2008 | Souders et al. ............... 709/226 |
| 2009/0089629 A1* | 4/2009 | Hawkins ....................... 714/100 |
| 2009/0089761 A1* | 4/2009 | Lazzaro et al. ............... 717/128 |
| 2010/0088313 A1* | 4/2010 | Hoffman et al. .............. 707/733 |
| 2011/0010162 A1* | 1/2011 | Elgazzar et al. ................ 704/2 |
| 2011/0197178 A1* | 8/2011 | Johnston ....................... 717/123 |
| 2011/0271149 A1* | 11/2011 | Roussel et al. ................ 714/46 |
| 2012/0042218 A1* | 2/2012 | Cinarkaya et al. ............ 714/57 |
| 2013/0013990 A1* | 1/2013 | Green et al. .................. 715/205 |
| 2013/0110494 A1* | 5/2013 | Elgazzar et al. ................ 704/3 |

OTHER PUBLICATIONS

Oney, Stephen, and Brad Myers. "FireCrystal: Understanding interactive behaviors in dynamic web pages." In Visual Languages and Human-Centric Computing, 2009. VL/HCC 2009. IEEE Symposium on, pp. 105-108. IEEE, 2009.*

* cited by examiner

*Primary Examiner* — Frank D Mills
(74) *Attorney, Agent, or Firm* — Park, Vaughan, Fleming & Dowler LLP

(57) ABSTRACT

The disclosed embodiments relate to a system that displays diagnostic information to facilitate web page development. While a web page is being assembled at a front-end system using data gathered from one or more back-end systems, the system accumulates metadata associated with the assembly process. Next, the system renders the web page using the gathered data. Finally, the system sends the rendered web page along with the metadata to a browser to be displayed to a user, wherein the browser is configured to selectively display the metadata when the web page is displayed.

21 Claims, 8 Drawing Sheets

WEB PAGE 400

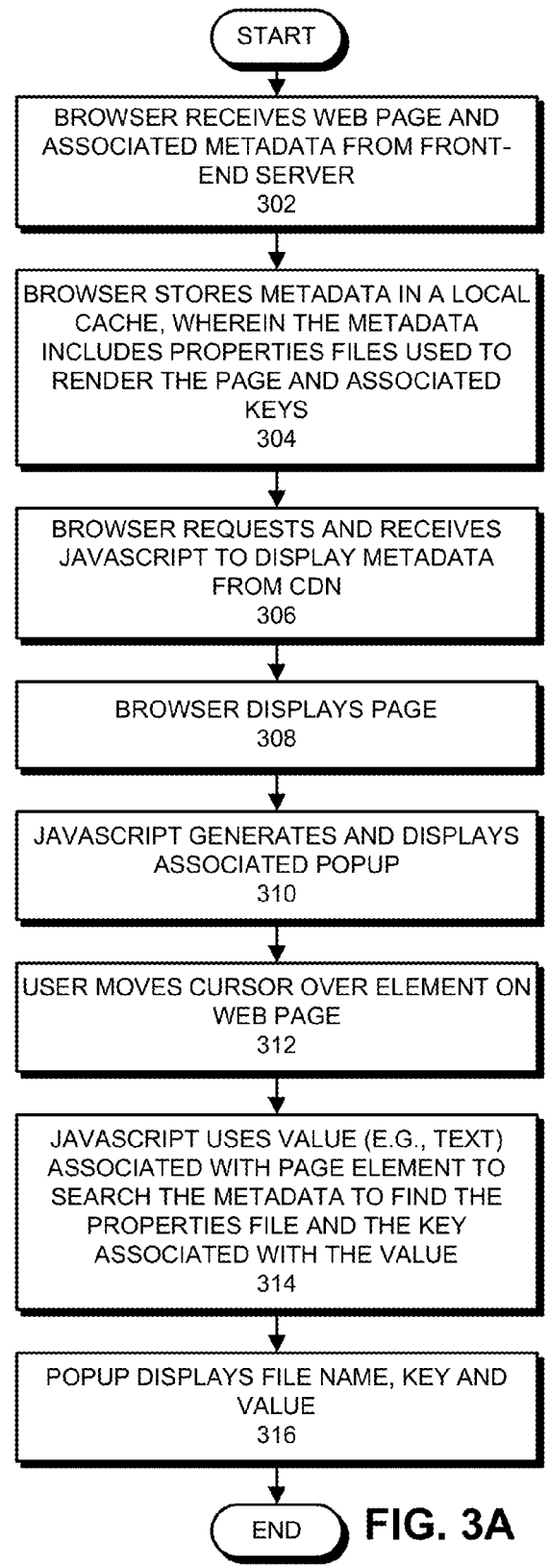

US 8,875,012 B1

FRONT-END TOOL FOR DISPLAYING DIAGNOSTIC INFORMATION TO FACILITATE WEB PAGE DEVELOPMENT

BACKGROUND

1. Field

The disclosed embodiments generally relate to software development tools. More specifically, the disclosed embodiments relate to the design of a front-end development tool that displays diagnostic information and/or performance metrics to facilitate web page development.

2. Related Art

In modern websites, a great amount of effort can go into assembling and rendering a web page that is ultimately presented to a user. For example, a front-end server that generates the web page frequently makes calls to one or more back-end servers to perform various operations and to gather data from multiple sources for the web page. Next, the front-end server incorporates this data into markup for the web page and sends the markup to a browser on a client system to be displayed to the user.

This distributed web-page-creation process can make it challenging to fix an error in the web page, because it is often difficult to identify the source of the error. For example, if a web page is generated for a user in a French-speaking country, the front-end server can translate the web page into French, and can possibly make calls to one or more back-end servers to perform various operations or to gather data to facilitate the translation process. In this case, if there is an error in the French-language text on the web page, the developer must somehow identify the source of the error, which can possibly exist in a number of files or servers located on different machines. In existing systems, this typically involves sifting through log files on various front-end and/or back-end servers to identify the source of the error, which can be an extremely time-consuming process.

BRIEF DESCRIPTION OF THE FIGURES

FIG. 3A presents a flow chart illustrating the process of displaying metadata in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

System for Generating a Web Page

Figure 1:
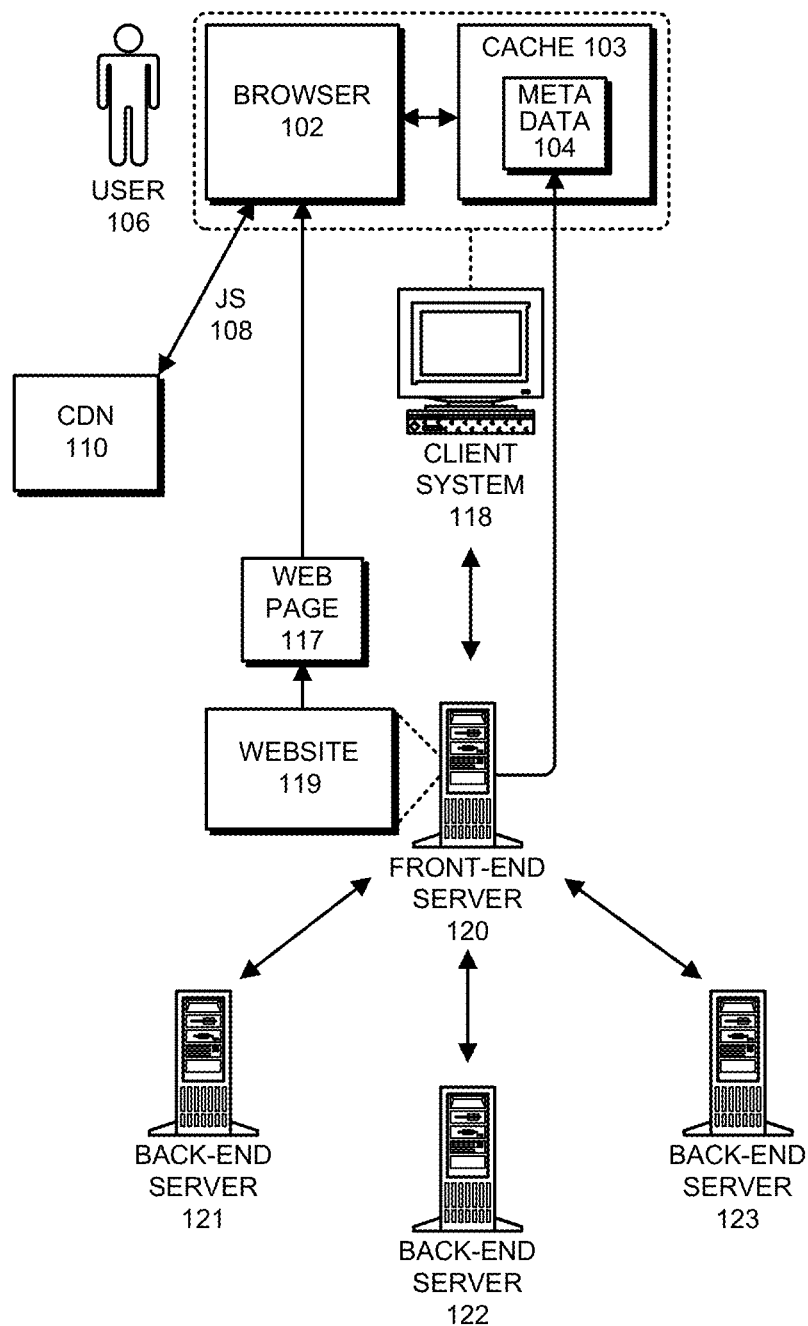
FIG. 1 illustrates a system that generates a web page in accordance with the disclosed embodiments.

FIG. 1 illustrates a system that generates a web page 117 in accordance with the disclosed embodiments. This system assembles and renders web page 117 at a front-end server 120 that hosts a website 119. As illustrated in FIG. 1, a user 106 can access website 119 through a browser 102 located on a client system 118. Note that website 119 can generally include any type of website comprising one or more web-interlinked pages which can be accessed by a user 106. In one embodiment, the website 119 provides access to an online professional network, such as the LinkedIn™ website hosted by the LinkedIn Corporation of Mountain View, Calif. Browser 102 can generally include any type of browser that can be used to view web pages, such as the Internet Explorer™ browser distributed by the Microsoft Corporation of Redmond, Wash., or the Firefox™ browser distributed by the Mozilla Corporation of Mountain View, Calif. Client system 118 can generally include any type of portable or non-portable computer system that is capable of hosting a web browser, such as a desktop computer system, a laptop computer system, a tablet computer system or a smartphone.

Browser 102 is associated with a cache 103 that can store a number of different items, such as markup for recently accessed web pages, JavaScript code and metadata 104, wherein metadata 104 is associated with the page-assembly process as is described in more detail below with reference to FIGS. 2A-5. Note that metadata 104 can generally include any type of data that can be used to determine how specific elements of web page 117 were assembled. For example, metadata 104 can include (1) a list of services that were accessed during the web-page-assembly process, (2) a list of files were accessed by the services, (3) data items that were returned by the services, and (4) a description of computational operations that were applied to the returned information to produce the data items. Browser 102 can additionally request and receive static JavaScript code (JS) 108 from a content distribution network 110 (CDN), wherein CDN 110 comprises a distributed set of servers configured to serve content to end-users with high availability and high performance.

During operation, front-end server 120 communicates with multiple back-end servers 121-123 to retrieve data items to be incorporated into various web pages. For example, a back-end server 121 can be responsible for translating textual information on a web page from a source language (such as US English) into a target language (such as French). In another example, back-end server 122 can provide real-time prices for stocks, and front-end server 120 can incorporate these real-time prices in a web page that displays an associated investment portfolio to a user.

During operation, user 106 causes browser 102 to request a web page 117 from website 119 on front-end server 120. In response to this request, front-end server 120 renders markup for the web page 117. This can involve making calls to back-end servers 121-123 to obtain raw data for web page 117. Front-end server 120 processes this raw data and incorporates it into the markup for web page 117. During this process, front-end server 120 and back-end servers 121-123 can collect metadata describing how data is assembled to produce web page 117. (Also, note that the web page can alternatively be assembled ahead of time, not in response to the browser requesting the web page.) Front-end server 120 accumulates this metadata 104 and sends it to browser 102 located on client system 118. Browser 102 can store this metadata 104 in a local cache 103 along with the markup for web page 117.

Note that web page 117 can be configured to request and receive JavaScript code (JS) 108 from CDN 110 to process metadata 104. In one embodiment, this JavaScript code renders a popup, which selectively displays portions of metadata 104 as is described in more detail below with reference to FIGS. 2A-5. Moreover, metadata 104 can be displayed in a number of different ways, such as by using a popup, temporarily switching to another page that displays the metadata, or displaying the metadata in a translucent overlay. Hence, the disclosed embodiments are not meant to be limited to using popups to display metadata.

Process of Gathering Metadata

Figure 2A:
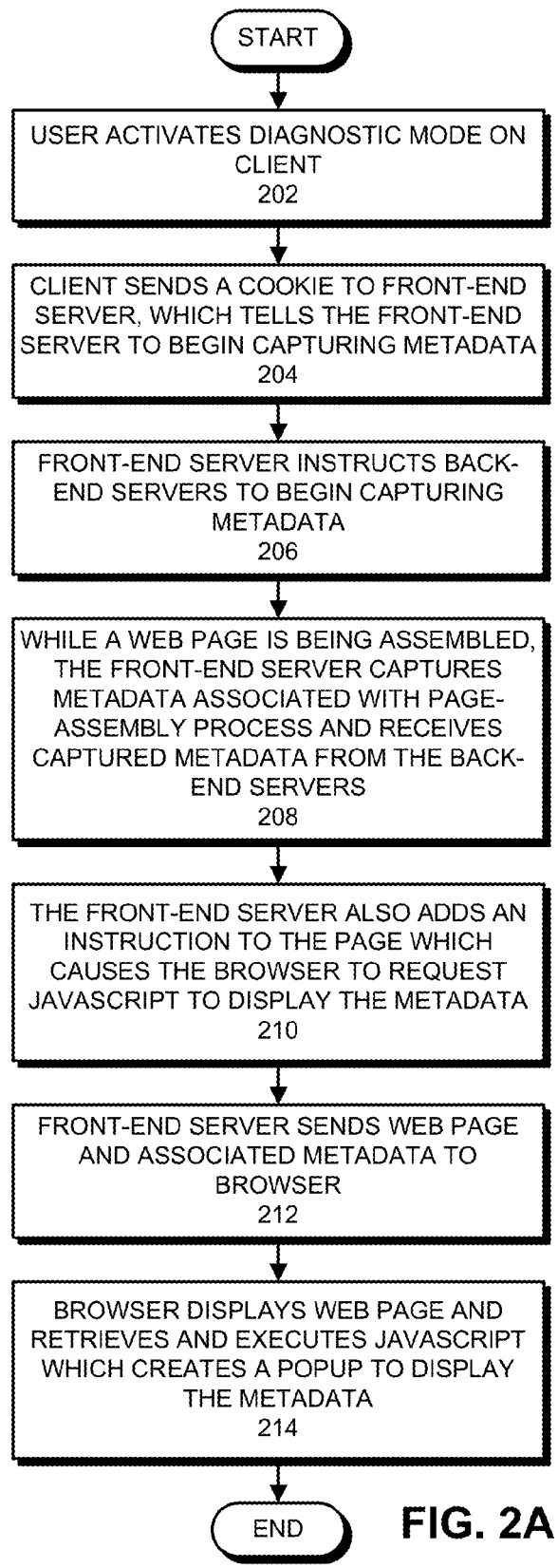
FIG. 2A presents a flow chart illustrating the process of gathering and displaying metadata associated with the web-page-assembly process in accordance with the disclosed embodiments.

FIG. 2A presents a flow chart illustrating the process of gathering and displaying metadata 104 associated with the assembly process for web page 117 in accordance with the disclosed embodiments. This process starts when the user triggers or somehow activates a special "diagnostic mode" on client system 118 (step 202). This can involve the user selecting an option to activate the special diagnostic mode while the user is accessing the website 119. Alternatively, an administrator associated with website 119 can activate the special diagnostic mode from client system 118 or from front-end server 120.

Next, in response to the user activating the special diagnostic mode, client system 118 sends a cookie to front-end server 120, wherein this cookie tells front-end server 120 to begin capturing metadata 104 associated with the page-assembly process (step 204). Then, front-end server 120 instructs back-end servers 121-123 to begin capturing metadata 104 associated with the page-assembly process (step 206). For example, suppose back-end server 121 is asked to provide a data value to be incorporated into the web page. While gathering metadata 104, back-end server 121 can keep track of which files were accessed by back-end server 121, what information was retrieved from the files, and what computational operations were performed on the retrieved information by back-end server 121 to generate a data value.

When web page 117 is being rendered by front-end server 120, front-end server 120 captures metadata 104 describing the assembly process and receives captured metadata 104 from the back-end servers 121-123 (step 208). While gathering this metadata 104, front-end server 120 can possibly create a "call graph" which lists services and/or servers that were accessed to assemble the page, and possibly how long each service took to execute. Note that services can possibly call other services, so the call graph can have multiple levels.

Metadata 104 can also include information from a JavaServer Pages (JSP) template or a Dynamic Web Template (DWT), which is used to render web page 117, wherein the JSP template or the DWT template indicates which files are accessed to create web page 117.

Front-end server 120 can also incorporate an instruction into web page 117 which causes browser 102 to retrieve static JavaScript code 108 from CDN 110, wherein JavaScript code 108 generates a popup (or some other user interface element) that can be used to selectively display the metadata 104 associated with the web page (step 210).

Next, front-end server 120 sends web page 117 and its associated metadata 104 to browser 102 (step 212), and browser 102 stores metadata 104 (and possibly the markup for web page 117) in local cache 103. Then, browser 102 displays web page 117 and also executes JavaScript code 108, which creates a popup to display metadata 104 as is described in more detail below with reference to FIGS. 3-5 (step 214).

Process of Gathering Performance Data

Figure 2B:
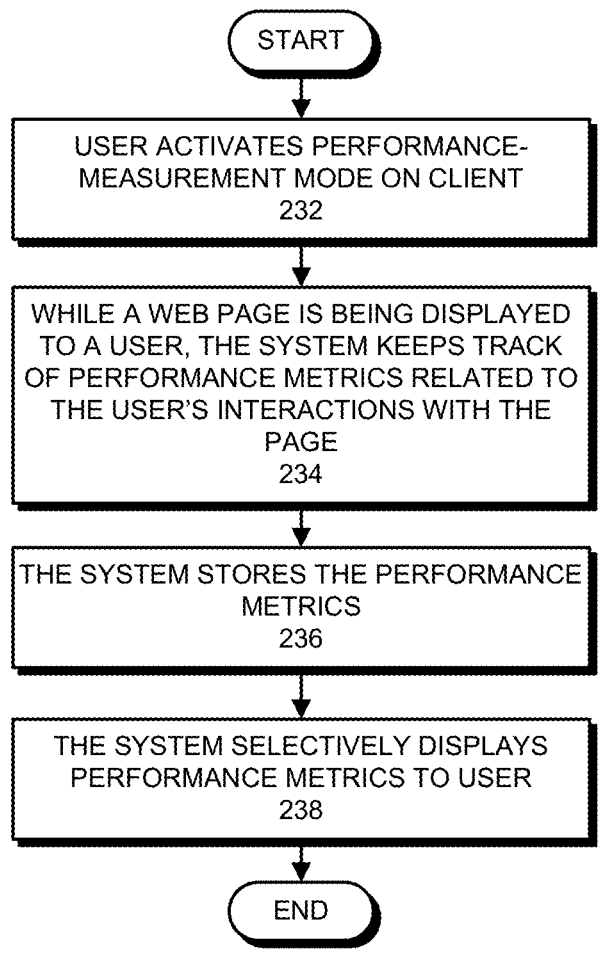
FIG. 2B presents a flow chart illustrating the process of gathering and displaying performance metrics associated with user interactions with a web page in accordance with the disclosed embodiments.

FIG. 2B presents a flow chart illustrating the process of gathering and displaying performance metrics associated with user interactions with web page 117 in accordance with the disclosed embodiments. Note that the same mechanism that can be used to display metadata about the web-page-assembly process can also be used to display metadata comprising performance metrics associated with web page 117. First, the user triggers or somehow activates a performance-monitoring mode on client system 118 (step 232). This can involve the user selecting an option to activate the performance-monitoring mode while the user is accessing the website 119. Alternatively, an administrator associated with website 119 can activate the performance-monitoring mode. Note that the performance-monitoring mode can be enabled separately from, or at the same time as, the diagnostic mode that gathers metadata associated with the web-page-assembly process.

Next, while the web page 117 is being displayed to the user, the system keeps track of various performance metrics related to the user's interactions with web page 117 (step 234). For example, the system can keep track of the number of queries per page. Or, the system can keep track of latency information for web page 117, which can involve keeping track of how long web page 117 takes to load, or how long specific elements within web page 117 take to load. The system can also keep track of how long the user views web page 117, or how often the user activates certain user interface elements (e.g., buttons) within web page 117.

Next, the system stores the measured performance metrics (step 236). This can involve storing the performance metrics in application-level data structures, system-level data structures, a special file, or possibly in cache 103.

Finally, the system selectively displays the performance metrics to the user (step 238). This can involve using a popup as described above.

Other Types of Data

The described embodiments can generally be used to display any type of metadata associated with web page 117. As mentioned above, metadata 104 can include a call graph specifying which services or servers were involved in generating the web page and how long each service took to execute. It can also include information from JSP/DWT templates specifying which files were accessed to generate the web page, and performance metrics associated with use of the web page.

In addition to these previously mentioned types of metadata, the system can also display metadata associated with translations of textual information in a web page. For example, a web page can be translated from a source language, such as US English, into a target language, such as French. This translation process can involve accessing a number of different services and files, and metadata 104 can keep track of which services and files were accessed.

The system can also display metadata that describes A/B tests, wherein during A/B tests different variations (treatments) of a web page are tested to determine their associated impact on user behavior. For example, an A/B test can be used to determine how effective different advertising messages are in causing a user to click on a link to an advertiser's website. In this example, the system can keep track of metadata that described different treatments for both the active and inactive A/B tests, as well as associated empirical data about resulting user behavior.

The system can additionally display metadata containing debugging information. For example, the front-end server 120 can keep track of warnings and error messages that are triggered as the web page is being assembled and rendered. The system can then selectively output these warnings and error messages using a popup when the associated web page is displayed.

Process of Displaying Metadata

FIG. 3A presents a flow chart illustrating the process of displaying metadata in accordance with the disclosed embodiments. At the start of this process, browser 102 receives markup for a web page 117 and associated metadata 104 from front-end server 120 (step 302). Next, browser 102 stores metadata 104 in a local cache 103 (step 304).

In one embodiment, metadata 104 comprises a set of properties files that were used to render the page, wherein each properties file includes sets of keys which index specific entries in the properties file, and associated values stored in the entries. However, note that metadata 104 can generally be stored in a wide range of formats with different indexing techniques. In one example, to facilitate translations of website text, a properties file might be associated with a specific language, such as German; the indices into the properties file can be associated with specific English phrases; and the associated values can be text strings containing German translations for the English phrases.

Next, in response to an instruction stored in web page 117, browser 102 requests and receives JavaScript code 108 for a popup from CDN 110 (step 306). Then, browser 102 display web page 117 (step 308), and JavaScript code 108 generates and displays a popup that can be used to selectively display metadata 104 (step 310).

The popup can display all of the metadata associated with web page 117, or alternatively can display selected portions of the metadata. For example, in one embodiment, when user 106 moves a cursor over a specific element on web page 117 (step 312), the system displays metadata associated with the element. In this embodiment, the JavaScript code 108 uses a value (e.g., a text string) associated with the element to search metadata 104 to identify a specific properties file and a specific key containing the value (text string) (step 314). Finally, the JavaScript code 108 uses a popup to display: (1) the file name for the properties file, (2) the specific key, and (3) the associated value (text string) (step 316). In another example, the popup displays all entries in properties files that match a specific value. For example, if the values are text strings, the popup can display all properties file entries that contain a specific keyword which is entered by the user.

Process of Displaying Additional Metadata

Figure 3B:
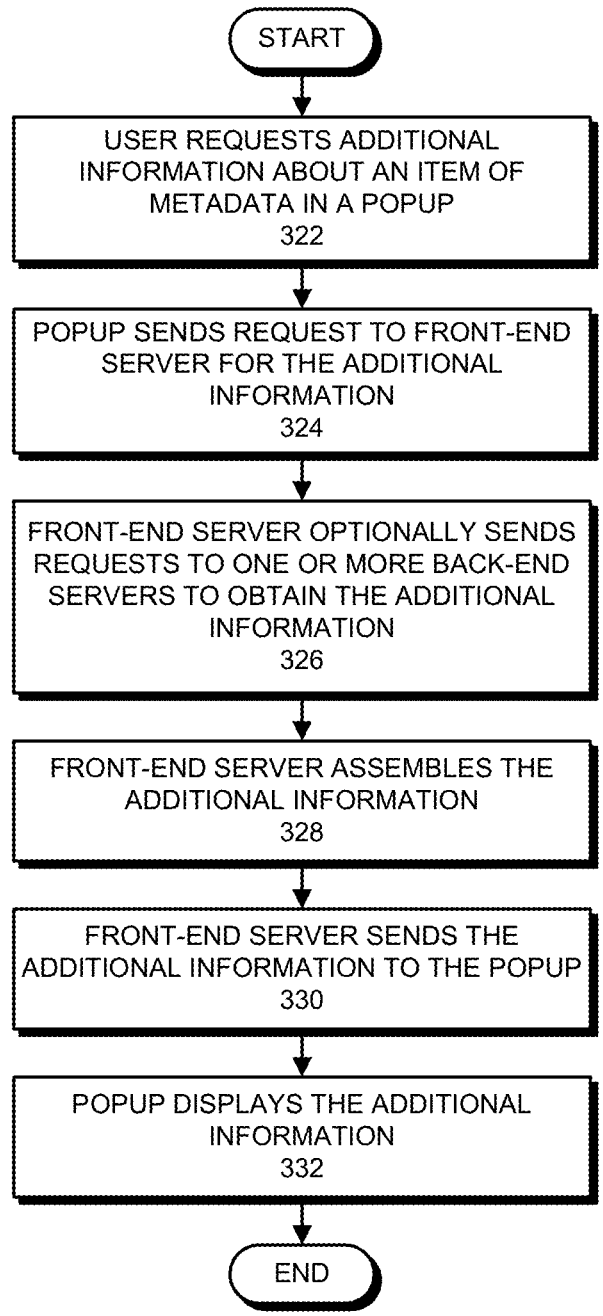
FIG. 3B presents a flow chart illustrating the process of displaying additional metadata in accordance with the disclosed embodiments.

FIG. 3B presents a flow chart illustrating the process of displaying additional metadata in accordance with the disclosed embodiments. In some cases, the user may want to obtain additional information about a specific item of metadata that appears in the popup. For example, if the popup displays a translation of a text string, the user may want to know the last date the translation was updated, or the user may want to obtain contact information for the person who performed the translation.

In some embodiments, the system allows the user to obtain the additional information as follows. First, the user requests additional information about an item of metadata which appears in the popup associated with a web page in a browser (step 322). This can involve double-clicking on the item of metadata in the popup, or entering a query for the additional metadata into a field in the popup. Next, the popup sends a request for the additional information to a front-end server (step 324). When the front-end server receives this request, the front-end server can possibly send associated requests to one or more back-end servers (step 326). In many cases, the additional metadata does not exist on the front-end server and it is necessary to query the back-end servers to obtain this additional metadata. In the example mentioned above, the contact information for the person who performed the translation may be located on a back-end server that stores the translations.

Next, the front-end server assembles the additional information (step 328), which can involve assembling information obtained from the front-end server and/or one or more back-end servers. The front end-server then sends the additional information to the popup (step 330). This enables the popup to display the additional information (step 332).

Popup

Figure 4:
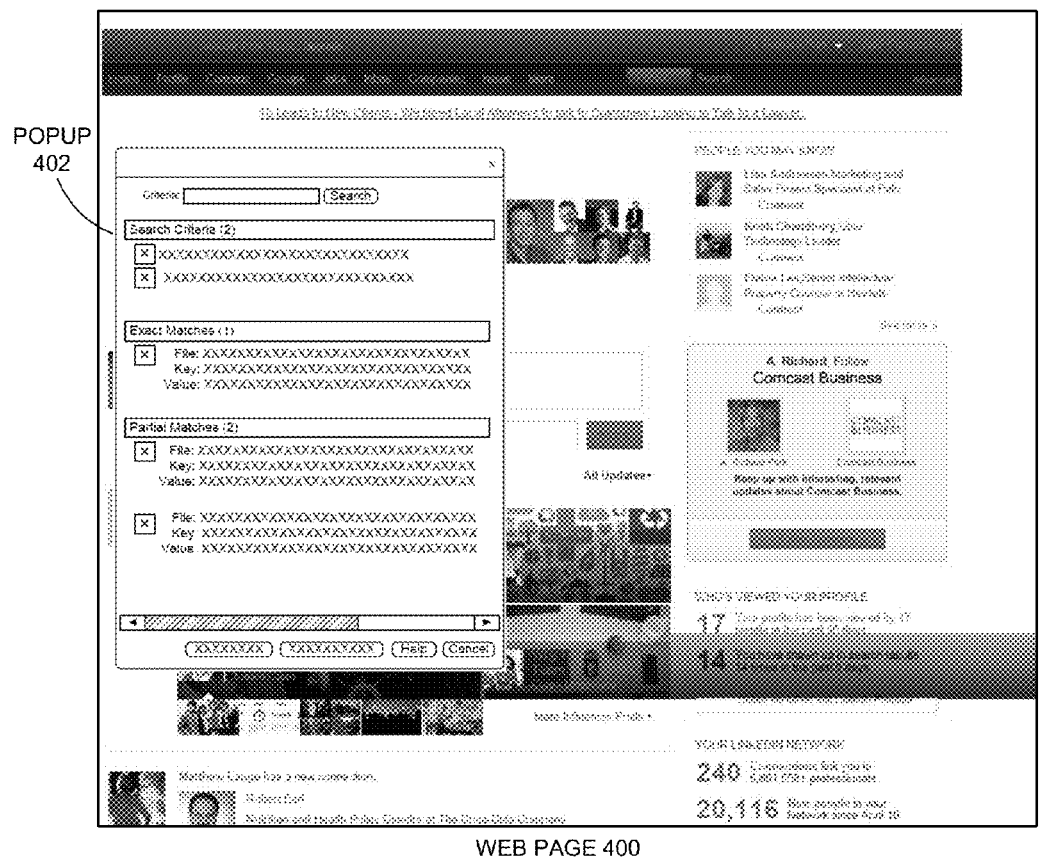
FIG. 4 illustrates a web page and an associated popup in accordance with the disclosed embodiments.
Figure 5:
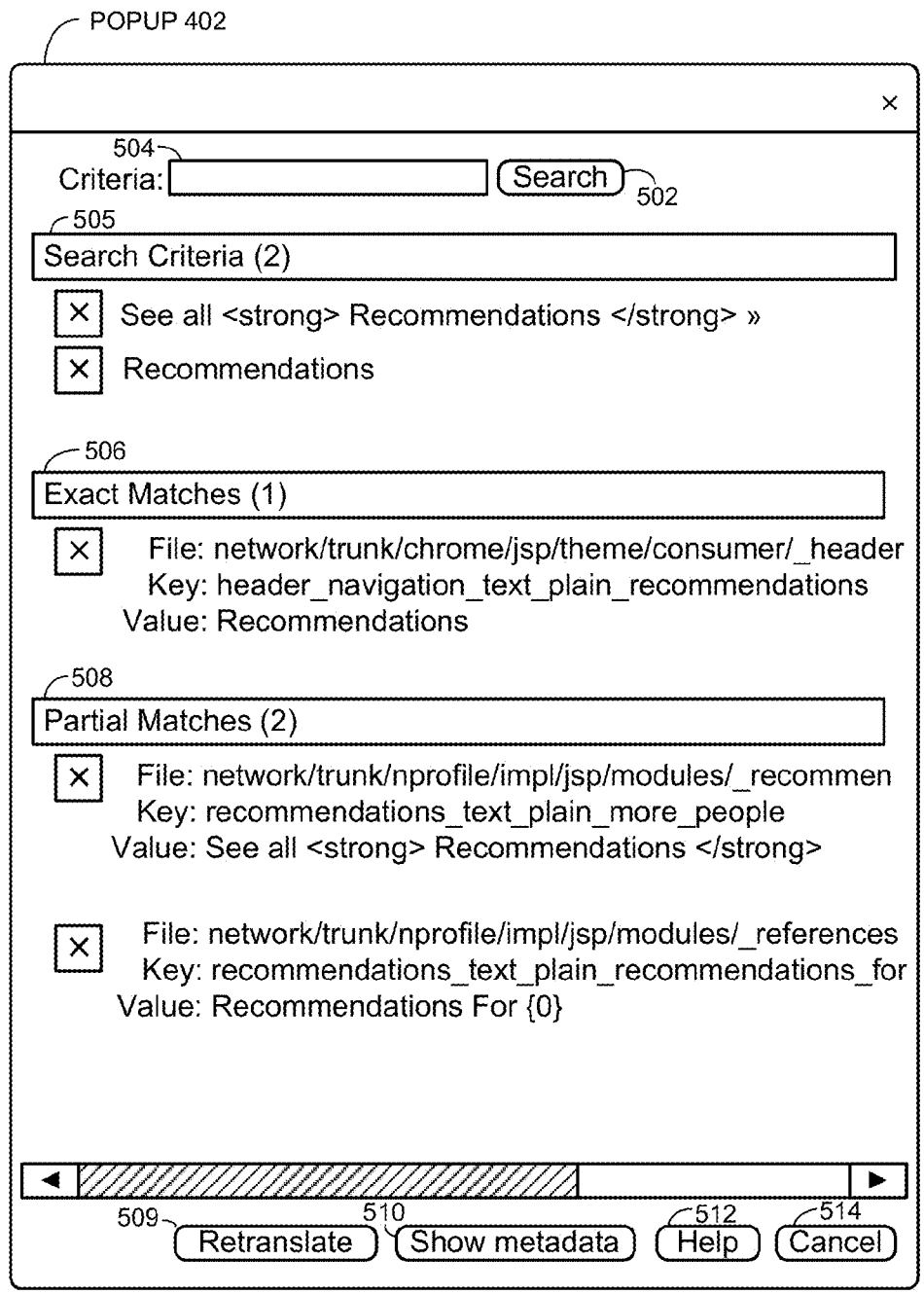
FIG. 5 illustrates a popup in accordance with the disclosed embodiments.

FIG. 4 illustrates a web page 400 and associated popup 402 for displaying metadata, and FIG. 5 illustrates more details about popup 402 in accordance with the disclosed embodiments. Note that popup 402 includes a criteria field 504 and a search button 502. The user can enter a string or a value into criteria field 504 and can activate search button 502 to find matching properties file entries. (Alternatively, as mentioned above, the search can be directed to metadata associated with a web page element in proximity to a cursor.) Note that popup 402 displays the specific search criteria 505. Popup 402 also displays properties file entries that are exact matches 506 and partial matches 508. Note that each displayed entry lists (1) the name of the properties file, (2) the key for the entry, and (3) the value stored in the entry. Finally, popup 402 includes a number of buttons, including buttons to: retranslate 509 (which is described in more detail below with reference to FIG. 6); show metadata 510; ask for help 512; and cancel a query 514.

Process of Fixing a Translation Error

Figure 6:
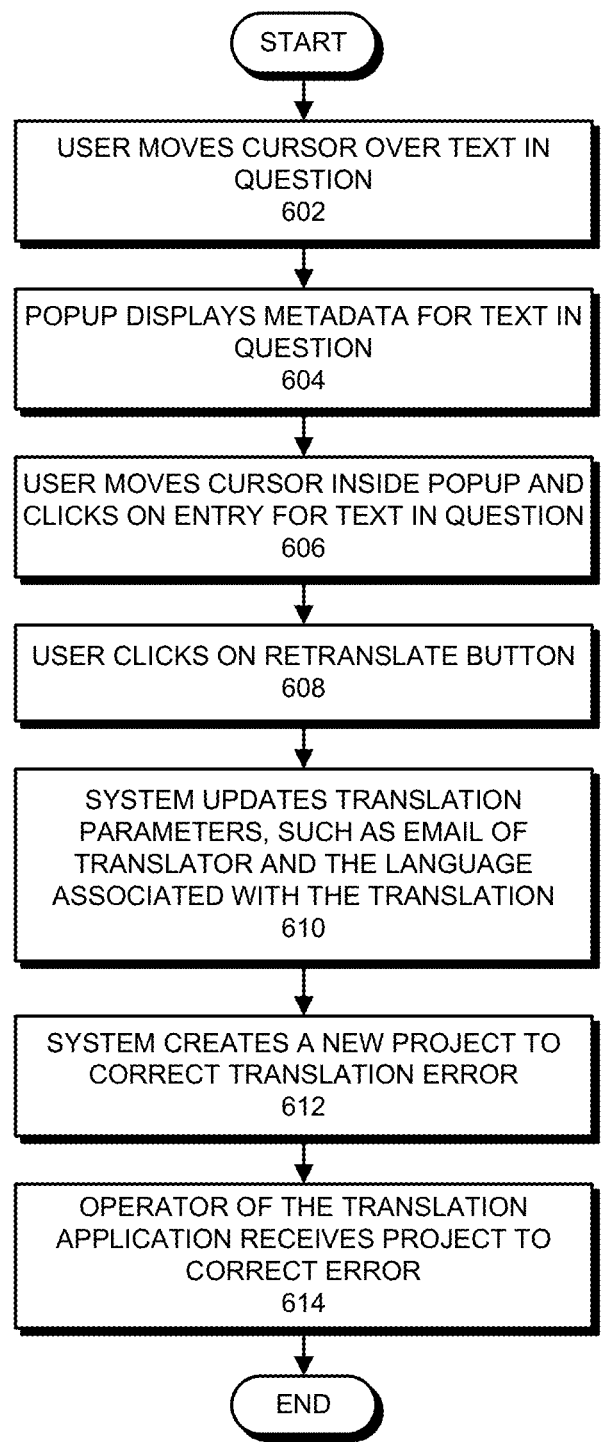
FIG. 6 presents a flow chart illustrating the process of fixing a translation error in accordance with the disclosed embodiments.

In one embodiment, the front-end tool is configured to fix translation errors in web pages, wherein the web page is translated from a source language, such as US English, into a target language, such as French. More specifically, FIG. 6 presents a flow chart illustrating the process of fixing a translation error in accordance with the disclosed embodiments. (Note that the corresponding popup for this embodiment appears in FIG. 5.) At the start of the process, the user identifies some text that appears to be mistranslated on a web page and moves a cursor over the text in question (step 602). Next, the popup selects and displays metadata associated with the text in question (step 604).

In order to fix the translation, the user moves the cursor inside the popup and clicks on the entry for the text in question (step 606). The user then clicks on the retranslate button 509 (step 608). Next, in preparation for retranslation, the system updates various translation parameters, such as the email address of the translator and the language associated with the translation (step 610). The system then creates a new project to correct the translation error (step 612), which can involve causing a service which is responsible for the translation to create the new project which is sent to a translation application. Subsequently, an operator of the translation application receives the project to correct the translation error (step 614). Finally, the operator corrects the translation which corrects a file or database that stores the translation, and this ultimately causes the corrected translation to be displayed in the web page.

Extensions

The above-described system can possibly be extended to mobile applications which display pages to a user, wherein the pages are assembled through a process which similarly involves a front-end server and one or more back-end servers. In general, the disclosed embodiments can be applied to any system that displays metadata associated with some type of user interface, such as a web page, a page of a mobile application, or a user interface for a desktop application. Note that, in mobile applications, instead of using a popup it may be more advantageous to allow the user to "swipe" the screen to uncover an underlying screen that contains the diagnostic information.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for displaying diagnostic information to facilitate web page development, comprising:
while a web page is being assembled at a front-end system using data gathered from one or more back-end systems, accumulating metadata associated with the assembly process;
configuring the web page to request and receive JavaScript (JS) code from a content distribution network (CDN), wherein the CDN comprises a distributed set of servers configured to serve content to end-users;
rendering the web page using the gathered data; and
sending the rendered web page to a browser to be displayed to a user, wherein the metadata is sent along with the rendered page, thereby enabling the browser to:
receive from the user a selection of a page element on the rendered web page;
use a string stored within the page element to perform a string search of the metadata to find a subset of metadata associated with the selected page element; and
display the subset of metadata to the user via a pop using the received JS code.

2. The method of claim 1, wherein the metadata includes a call graph that identifies one or more services that were accessed during the assembly process.

3. The method of claim 1, wherein the metadata includes a template which identifies source files that were used to render the web page.

4. The method of claim 1, wherein the metadata additionally includes performance metrics associated with the web page, so that the performance metrics can be selectively displayed when the web page is displayed.

5. The method of claim 1, wherein the metadata identifies currently active A/B tests, inactive A/B tests and associated treatments.

6. The method of claim 1, wherein the metadata includes page-level and page-module-level debugging information.

7. The method of claim 1, wherein upon receiving a request from the browser asking for additional metadata, the method further comprises:
forwarding the request to one or more back-end servers; and
when the additional metadata is received in response to the request from the one or more back-end servers, forwarding the additional metadata to the browser.

8. The method of claim 1, wherein the popup displays metadata associated with one or more elements over which a cursor is positioned in the web page.

9. The method of claim 1, wherein the popup displays metadata associated with one or more keywords entered by the user.

10. The method of claim 1, further comprising:
receiving a cookie from the browser that requests that metadata associated with a page-assembly process be captured; and
in response to receiving the cookie, instructing back-end systems to capture metadata associated with the page-assembly process.

11. A method for displaying diagnostic information to facilitate web page development, comprising:
receiving, at a browser, a web page along with metadata that relates to the process of assembling the web page, wherein the metadata was accumulated while the web page was being assembled at a front-end system using data gathered from one or more back-end systems;
configuring the web page to request and receive JavaScript (JS) code from a content distribution network (CDN), wherein the CDN comprises a distributed set of servers configured to serve content to end-users;
displaying the web page to a user;
receiving from the user a selection of a page element on the web page;
using a string stored within the page element to perform a string search of the metadata to find a subset of metadata associated with the selected page element; and
displaying the subset of metadata to the user via a popup using the received JS code.

12. The method of claim 11, wherein the popup displays metadata associated with one or more elements over which a cursor is positioned in the web page which is controlled by the user.

13. The method of claim 11, wherein the popup displays metadata associated with one or more keywords entered by the user.

14. The method of claim 11, wherein upon receiving a request from the user asking for additional metadata, the method further comprises:

forwarding the request to the front-end server, wherein the front-end server forwards the request to one or more back-end servers; and when the additional metadata is received from the front-end server and the one or more back-end servers in response to the request, displaying the additional metadata to the user.

15. A non-transitory computer-readable storage medium storing instructions that when executed by a computer cause the computer to perform a method for displaying diagnostic information to facilitate web page development, the method comprising:

while a web page is being assembled at a front-end system using data gathered from one or more back-end systems, accumulating metadata associated with the assemble process;

configuring the web page to request and receive JavaScript (JS) code from a content distribution network (CDN), wherein the CDN comprises a distributed set of servers configured to serve content to end-users;

rendering the web page using the gathered data; and sending the rendered web page to a browser to be displayed to a user, wherein the metadata is sent along with the rendered web page thereby enabling the browser to:

receive from the user a selection of a page element on the rendered web page;

use a string stored within the page element to perform a string search of the metadata to fins a subset of metadata to find a subset of metadata associated with the selected page element; and display the subset of metadata to the user via a popup using the received JS code.

16. A computer system that facilitates displaying diagnostic information for web page development, comprising:

a hardware module; and a process, wherein the process is stored in the hardware module and configurable to be executed by the hardware module, configured to:

assemble a web page using data gathered from one or more back-end systems, accumulate metadata associated with the assembly process, configure the web page to request and receive JavaScript (JS) code from a content distribution network (CDN), wherein the CDN comprises a distributed set of servers configured to serve content to end-users, render the web page using the gathered data, and send the rendered web page to a browser to be displayed to a user, wherein the metadata is sent along with the rendered web page, thereby enabling the browser to:

receive from the user a selection of a page element on the rendered web page;

use a string stored within the page element to perform a string search of the metadata to fins a subset of metadata to find a subset of metadata associated with the selected page element; and display the subset of metadata to the user via a popup using the received JS code.

17. The computer system of claim 16, wherein the metadata includes a call graph that identifies one or more services that were accessed during the assembly process.

18. The computer system of claim 16, wherein the metadata includes a template which identifies source files that were used to render the web page.

19. The computer system of claim 16, wherein the metadata additionally includes performance metrics associated with the web page, so that the performance metrics can be selectively displayed when the web page is displayed.

20. The computer system of claim 16, wherein the metadata identifies currently active A/B tests, inactive A/B tests and associated treatments.

21. The computer system of claim 16, wherein the metadata includes page-level and page-module-level debugging information.

* * * * *